(12) United States Patent
Kolarovic

(10) Patent No.: US 6,641,521 B2
(45) Date of Patent: Nov. 4, 2003

(54) ADAPTIVE MOTOR SPEED CONTROL IN AN INFANT INCUBATOR

(75) Inventor: Ronald S. Kolarovic, Cinnaminson, NJ (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 10/068,691

(22) Filed: Feb. 6, 2002

(65) Prior Publication Data

US 2002/0147381 A1 Oct. 10, 2002

Related U.S. Application Data

(60) Provisional application No. 60/266,676, filed on Feb. 6, 2001.

(51) Int. Cl.$^7$ ................................................. A61G 11/00
(52) U.S. Cl. ....................................................... 600/22
(58) Field of Search ............................ 600/21–22, 549

(56) References Cited

U.S. PATENT DOCUMENTS

| | | | |
|---|---|---|---|
| 3,335,713 A | 8/1967 | Grosholz et al. |
| 3,338,233 A | 8/1967 | Grosholz et al. |
| 3,529,131 A | 9/1970 | Gordon et al. |
| 3,920,000 A | 11/1975 | Atherton et al. |
| 4,034,740 A | 7/1977 | Atherton et al. |
| 4,328,793 A | 5/1982 | Martin |
| 4,750,474 A | 6/1988 | Dukhan et al. |
| 5,385,529 A | 1/1995 | Koch |
| 5,415,618 A | 5/1995 | Koch |
| 5,530,766 A | 6/1996 | Hong et al. |
| 5,730,355 A | 3/1998 | Lessard et al. |
| 5,759,149 A | 6/1998 | Goldberg et al. |
| 5,817,003 A | 10/1998 | Moll et al. |

*Primary Examiner*—John P. Lacyk
(74) *Attorney, Agent, or Firm*—Barnes & Thornburg

(57) ABSTRACT

An infant incubator of the type having an enclosure within which the infant is held and an air circulation system with a heater and a motor driven blower is disclosed. An adaptive motor speed controller having a sensor providing an indication of the stability of the temperature of the infant is coupled to the blower motor and controls the motor speed at least in part based on the stability of the temperature of the infant. While the infant's temperature is stable, the motor speed is reduced within limits.

48 Claims, 11 Drawing Sheets

ADAPTIVE MOTOR SPEED CONTROL IN AN INFANT INCUBATOR

This application claim benefit to provisional application No. 60/266,676, filed Feb. 6, 2001.

BACKGROUND AND SUMMARY OF THE INVENTION

The present invention relates generally to incubators and more particularly to incubators having heaters and blowers for circulating warm air within the incubator, and even more particularly to controlling the speed of the motor driving the blower in response to the stability of the temperature of an infant within the incubator.

It is known to control the temperature of the air adjacent an infant in an incubator. It is also known to circulate the air within an incubator with a blower driven by a motor and to vary the blower speed based on the temperature of the air within the incubator. Thermistors for sensing air temperature and motor controllers are known and have been used to control the temperature of the air adjacent an infant in an incubator by controlling the output of the heater and by controlling the speed at which air is passed by the heater prior to infusion into an incubator hood. It is also known to attach transducers to infants in an incubator to directly measure the infants temperature.

Lessard et al., U.S. Pat. No. 5,730,355, discloses an incubator that increases the blower motor speed, and also the heater power, upon receiving a signal from a sensor indicating that an access panel has been opened. The duration of the increased blower motor speed (and heater power) is dependent at least in part on signals indicative of the infant skin temperature.

It has been found that when air is circulated within an incubator, the air flow over the infant increases evaporation losses. However, a certain amount of airflow is required in an incubator to evacuate carbon dioxide and replenish the oxygen content with outside air. It has also been found that motor and blower noise can be disruptive to infants. Reduction of the blower speed under certain circumstances to a level sufficient to maintain proper oxygen and carbon dioxide content of the air in the hood, would reduce evaporation losses and disruptive noise.

An infant incubator with a warm air circulation system including a heater and a motor driven blower controlled by an adaptive motor controller is disclosed. The disclosed control system reduces evaporative losses and blower noise while maintaining sufficient air flow for oxygen replenishment and carbon dioxide evacuation. The control system includes one or more sensors for determining the temperature of the infant and systems providing an output indicative of the stability of that temperature and a speed controller for the blower motor. The speed controller is operatively connected to the one or more temperature sensors to vary the speed of the blower motor dependent upon the stability of the temperature of the infant. Thus, the blower motor speed is determined at least in part by the stability of the temperature of the infant.

According to one aspect of the disclosure, an infant care unit has a platform upon which an infant rests, a canopy over the infant providing an enclosure with a controlled environment for the infant, an air circulation system having a heater and a blower driven by a blower motor to circulate warm air in the enclosure, and a control system for the air circulation system. The control system includes one or more sensors for determining the stability of the temperature of the infant and providing an output indicative of that temperature, and a speed controller for the blower motor. The speed controller is operatively connected to the one or more temperature sensors to vary the speed of the blower motor dependent upon the stability of the temperature of the infant. Thus, blower motor speed is determined at least in part by the stability of the temperature of the infant.

According to another aspect of the disclosure, adaptive motor speed controller for an incubator for an infant comprises one or more sensors for determining the stability of the temperature of the infant. The blower speed controller is responsive at least in part to the output of the one or more sensors to vary the blower speed and thereby vary the circulation of air in the incubator.

According to yet another aspect of the disclosure, a method for varying the blower speed of an incubator air circulation system of the type comprising a blower motor and a motor speed control circuit is disclosed. The method comprises the steps of sensing the stability of the temperature of an infant within the incubator and controlling the speed of the blower motor based at least in part on the stability of the temperature of the infant.

According to a further aspect of the disclosure, a control system is disclosed for controlling the volume of fluid circulated within an incubator carrying an infant. The control system comprises a temperature sensor and fluid control circuitry. The temperature sensor is positioned to sense the stability of the temperature of the infant and provide a temperature signal in response thereto. The fluid flow circuitry is operatively coupled to the temperature sensor and is configured to establish the volume of fluid circulated within the incubator in response to the temperature signal.

An incubator for an infant is disclosed according to another aspect of the disclosure. The incubator comprises a platform, a canopy, a sensor, and a blower assembly. The platform carries the infant and cooperates with the canopy to define a chamber receiving the infant. The sensor is positioned to sense the stability of the temperature of the infant and provide a temperature signal in response thereto. The blower assembly includes a fan, a motor, and a controller. The motor operates the fan to circulate air within the incubator. The controller is operatively coupled to the motor and to the sensor and establishes the speed of the motor and the speed of the fan in response to the temperature signal.

Additional features of the invention will become apparent to those skilled in the art upon consideration of the following detailed description of a preferred embodiment exemplifying the best mode of carrying out the invention as presently perceived.

BRIEF DESCRIPTION OF THE DRAWINGS

In describing the disclosed invention reference will be made to the drawings in which.

DETAILED DESCRIPTION OF THE DRAWINGS

Incubators and infant warmers are enclosures used to maintain the oxygen content, relative humidity, and air temperature surrounding an infant or baby at appropriate levels. Incubators are well known in the art and are described in Moffett et al., U.S. Pat. No. 5,224,923, McDonough, U.S. Pat. No. 5,242,375, Storti et al. U.S. Pat. No. 5,330,415, Miller et al., U.S. Pat. No. 5,336,156, Lessard et al., U.S. Pat. No. 5,730,355, the disclosures of which are incorporated herein by this reference. Incubators typically include one or more devices for regulating and sensing the temperature, flow, oxygen content, and relative humidity of the air in the incubator and for sensing the temperature of an infant in an effort to properly regulate the temperature and health of the infant within the incubator.

Figure 1:
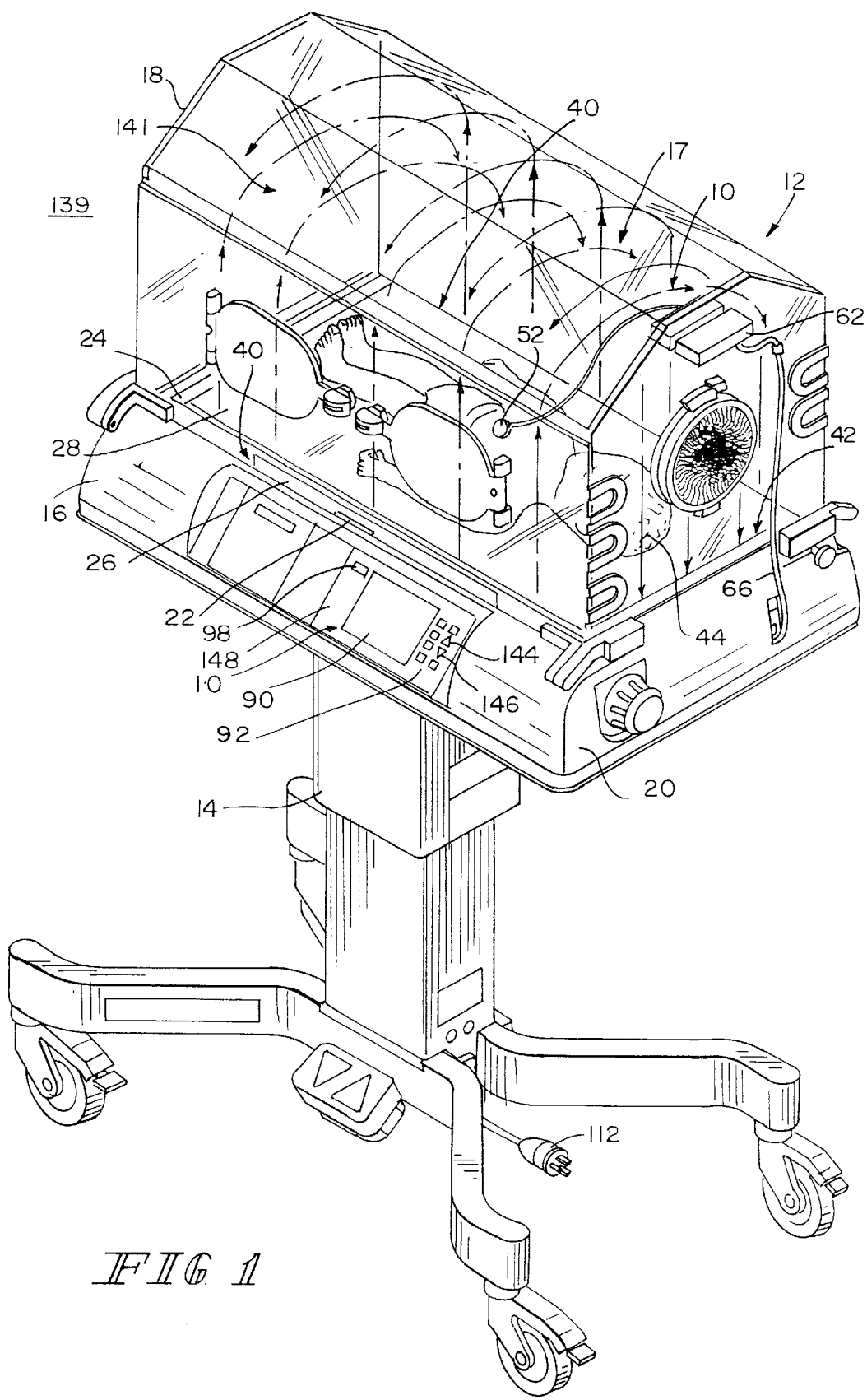
FIG. 1 is a perspective view of an infant incubator having a pedestal, a shell, a canopy, and an adaptive motor speed controller controlling the circulation of air around an infant held in the enclosure in response to a sensor signal indicating the temperature of the infant.
Figure 2:
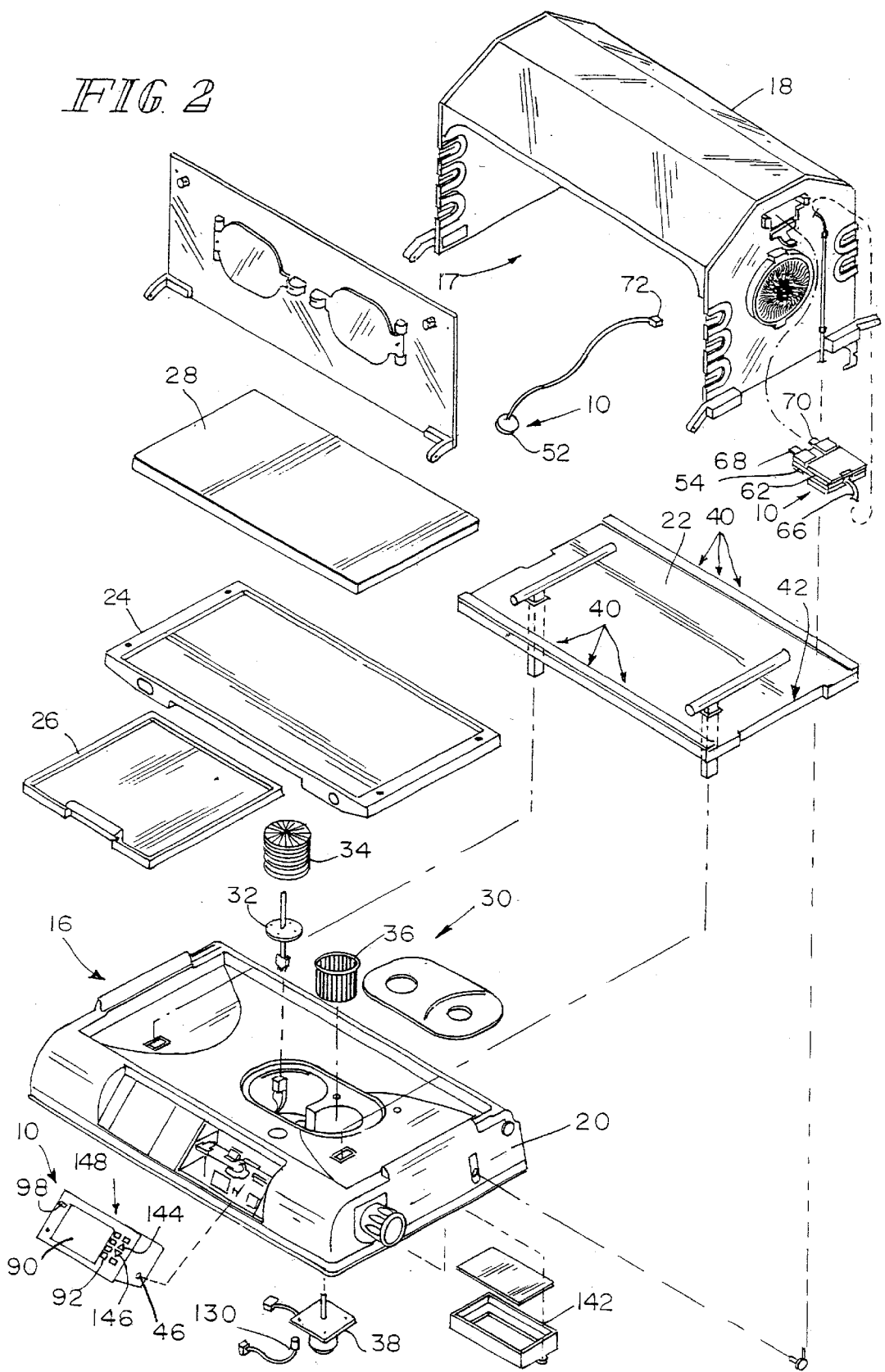
FIG. 2 is an exploded view of the shell and canopy of the infant incubator of FIG. 1 showing a sensor module through which a skin probe communicates with a control panel assembly to control the blower motor of a blower of an air circulation system which also includes a heater.

As shown in FIGS. 1 and 2, adaptive motor speed controller 10 is incorporated in an incubator 12. Incubator 12 includes a pedestal 14 supporting a shell 16 and a hood or canopy 18 at a convenient height for access by a caregiver. Shell 16 and hood 18 combine to define an enclosure or chamber 17. Illustratively, shell 16 includes a housing 20, a deck 22 and a mattress tray 24 with x-ray tray 26. A mattress 28 is supported on mattress tray 24 above deck 22. As shown, for example, in FIG. 2, an air circulation system 30 is located in shell 16. Air circulation system 30 includes a heater 32 with radiator fins 34, a blower, fan or impeller 36 and a blower motor 38 mounted in housing 20. Housing 20 and deck 22 are configured and arranged to form ductwork communicating with the interior of the enclosure 17 through inlets 40 and outlets 42. Mattress tray 24 is sized to permit air to flow from inlets 40 around mattress tray 24 and through enclosure 17 to outlets 42. Thus, air circulates above and around an infant 44 supported on mattress 28. Components of shell 16 act as a platform upon which the infant 44 is supported. Incubator 12 provides a controlled environment for the infant 44 through air circulation system 30.

Blower 36 circulates warm air in the enclosure 17 (as shown by unnumbered arrows in FIG. 1) with the air being moved at a flow rate governed by the speed of the blower motor 38. Thus, the systems controlling the speed of the blower motor 38 are essentially fluid flow circuitry. As shown, for example, in FIG. 5, a control system 46, which includes components of adaptive motor speed controller 10, regulates the air circulation system 30. In the illustrated embodiment, control system 46 includes a microprocessor 48 which also controls and monitors other incubator systems.

Figure 3:
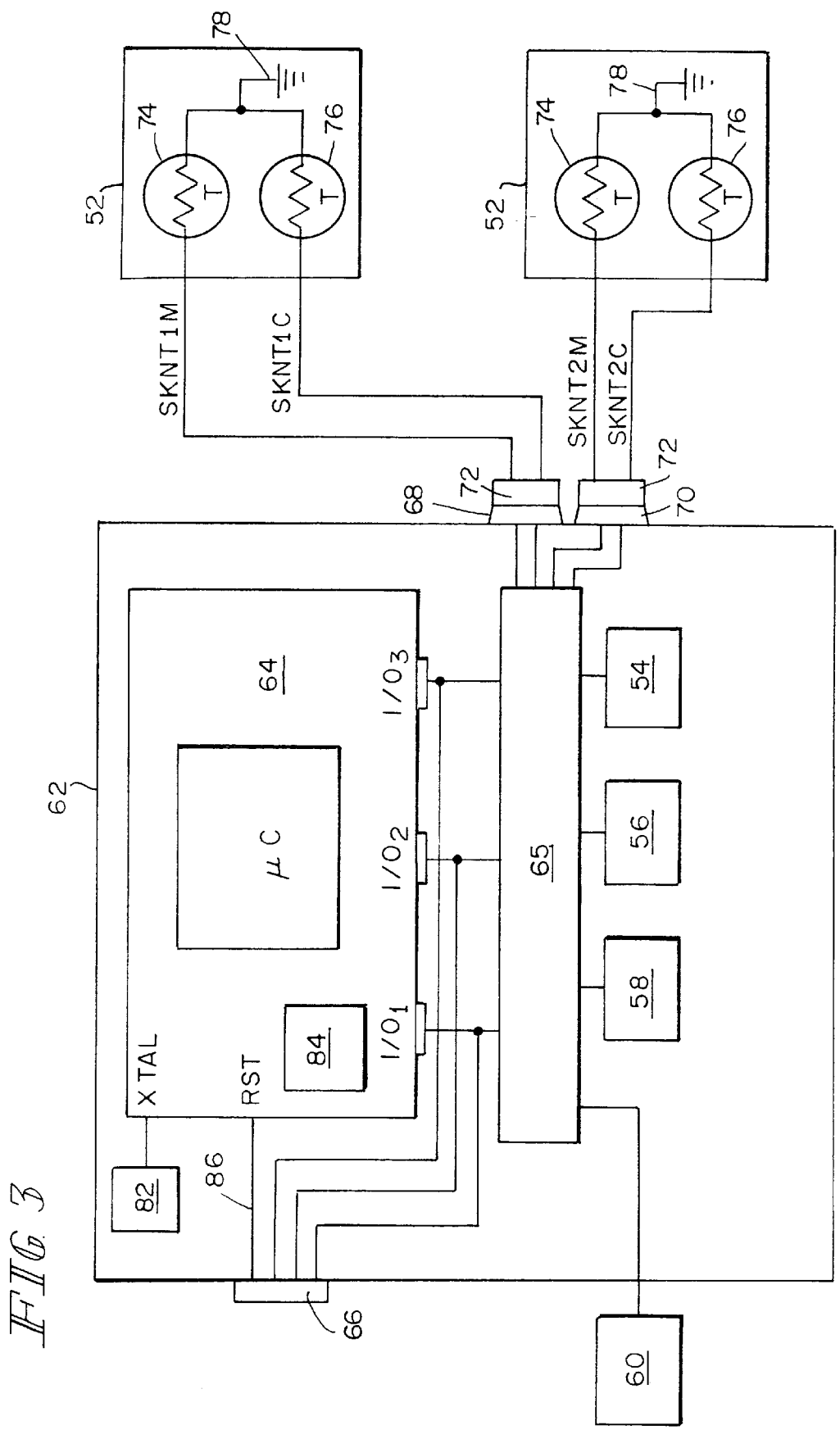
FIG. 3 is a diagrammatic view of the sensor module and skin temperature probes of FIG. 2.

As shown, for example, in FIG. 3, in the illustrated embodiment, signals from skin temperature sensor or probe 52, air temperature sensor 54, humidity sensor 56, oxygen sensor 58 and weight sensor 60 are initially read and processed by a sensor module 62. Sensor module 62 includes a microcontroller 64 and appropriate filters, amplifiers, and analog to digital converters referred to as signal pre-processors 65. The signals processed by signal pre-processors 65 and sensor module 62 are transmitted through serial data communications 66 to microprocessor 48.

Figure 7:
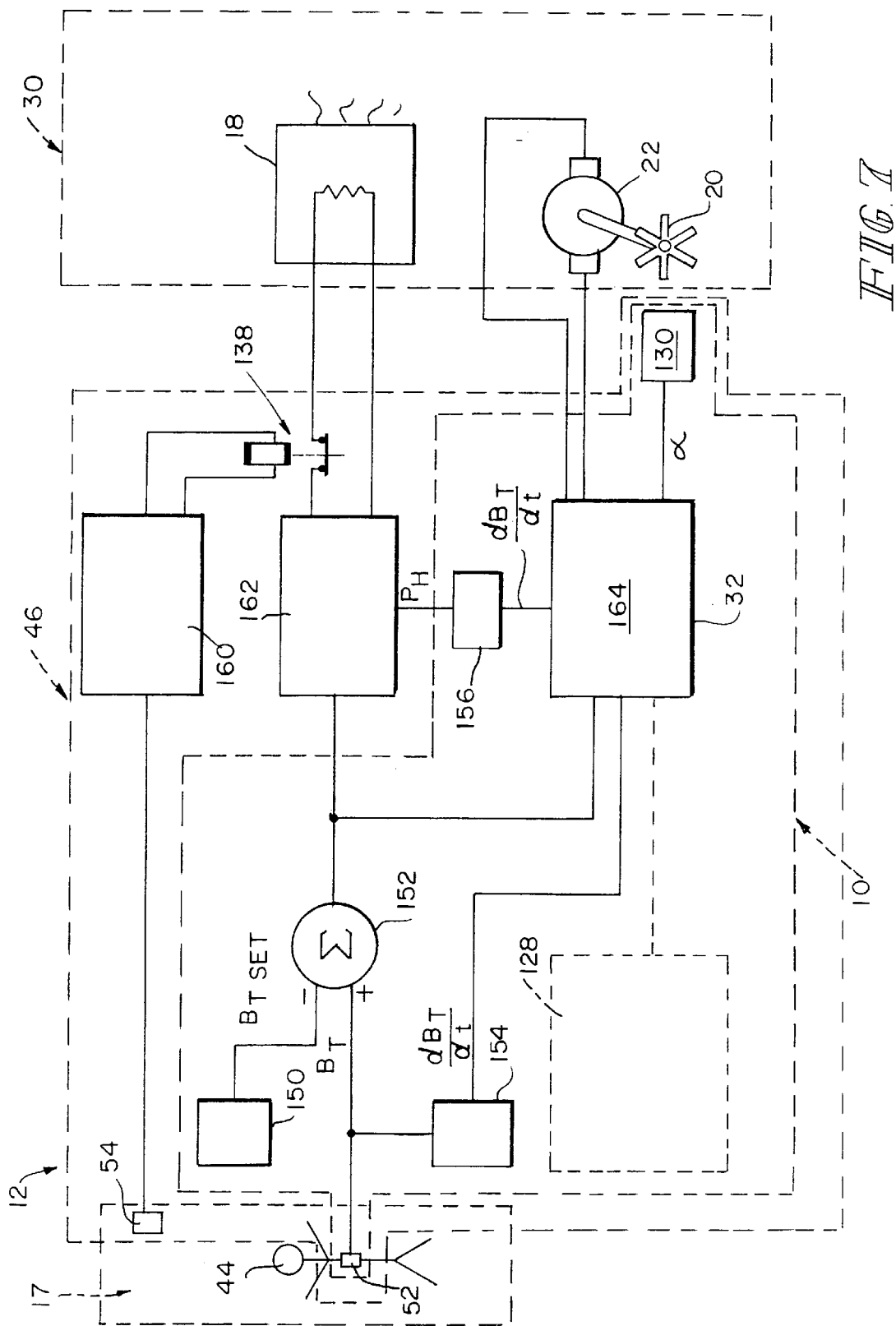
FIG. 7 is a simplified diagrammatic view of the incubator of FIG. 1 showing the adaptive motor speed controller controlling the motor of a blower in response to the temperature of the infant and possibly other signals (shown in phantom lines) and also showing a controller controlling the heater in response the temperature of the infant and the temperature of the air in the enclosure.

As shown, for example, in FIG. 3, in the illustrated embodiment, sensor module 62 includes two connectors 68, 70 for coupling to connectors 72 of two separate skin temperature probes 52 (only one of which is shown in FIGS. 1, 2 and 7). Each skin temperature probe 52 contains dual thermistors 74, 76. The two thermistors 74, 76 of each probe are connected to SKNTXM and SKNTXC, respectively, (where X is either 1 or 2 depending on the probe number and thermistor 74 is the M thermistor and thermistor 76 is the C thermistor, as shown for example in FIG. 3), and a common connector to ground 78. Both of the illustrated probes 52 have high frequency filtering by inductor networks (not shown).

Illustratively, microcontroller 64 is a PIC16C73 used for signal processing and control of all signals on the sensor module 62. Microcontroller 64 has three external ports 80 configurable as inputs and outputs. Microcontroller 64 operates from a precise time base of a crystal clock 82 operating at 4 MHz. The instruction cycle time of microcontroller 64 is 1 MHz or 1 microsecond. Microcontroller 64 operates with an internal watchdog timer 84 that asserts a reset signal in the event the program execution is operating outside of normal parameters. A reset line 86 of microcontroller 64 is also available to microprocessor 48 of control system 46 if control system 46 determines that the sensor module 62 requires reset intervention.

It will be appreciated that while incubator 12 has been described with regard to a specific incubator embodiment, incubator 12 may be provided in a variety of styles and designs in keeping with the teachings of this disclosure. Incubator 12 may also include other modules such as oxygen cells, scales, humidity sensors, and skin probes for sensing circulation, skin perfusion, heart rate, and respiration rate of the infant. However, it is within the scope of the invention as presently perceived for adaptive motor speed controller 10 to be used in conjunction with an incubator that does not include any of these other modules, or a different combination of illustrated modules and the other modules. Also while the term incubator 12 is used herein, the adaptive motor speed controller 10 disclosed herein may be used with a variety of patient supports and enclosures. Examples of such patient supports and enclosures may be found in the disclosures of Donnelly et al., U.S. Pat. No. 5,453,077; Goldberg et al., U.S. Pat. No. 5,759,149; Donnelly et al., U.S. Pat. No. 5,817,002; Moll et al, U.S. Pat. No. 5,817,003; Newkirk et al., U.S. Pat. No. 5,971,913; Donnelly et al., U.S. Pat. No. 5,971,914; Goldberg et al., U.S. Pat. No. 6,024,694; Goldberg et al., U.S. Pat. No. 6,036,634; Goldberg et al., U.S. Pat. No. 6,022,310; Speraw et al., U.S. Pat. No. 6,071,228;

Prows et al., U.S. Pat. No. 6,049,924; and Copending U.S. application Ser. Nos. 09/571,449 and 09/533,531; the disclosures of which are incorporated herein by this reference.

Figure 4:
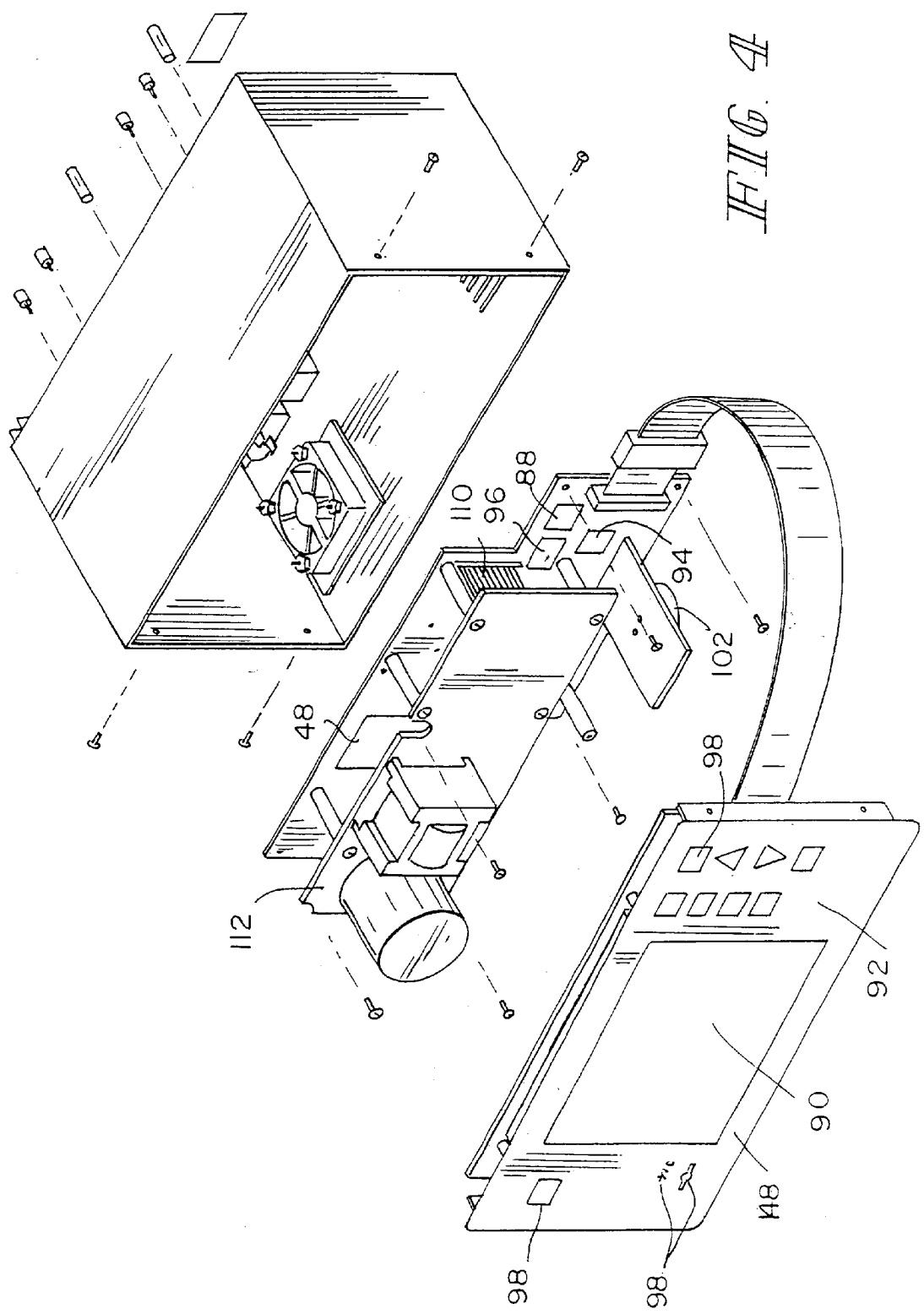
FIG. 4 is an exploded view of the control panel assembly of FIG. 2
Figure 5:
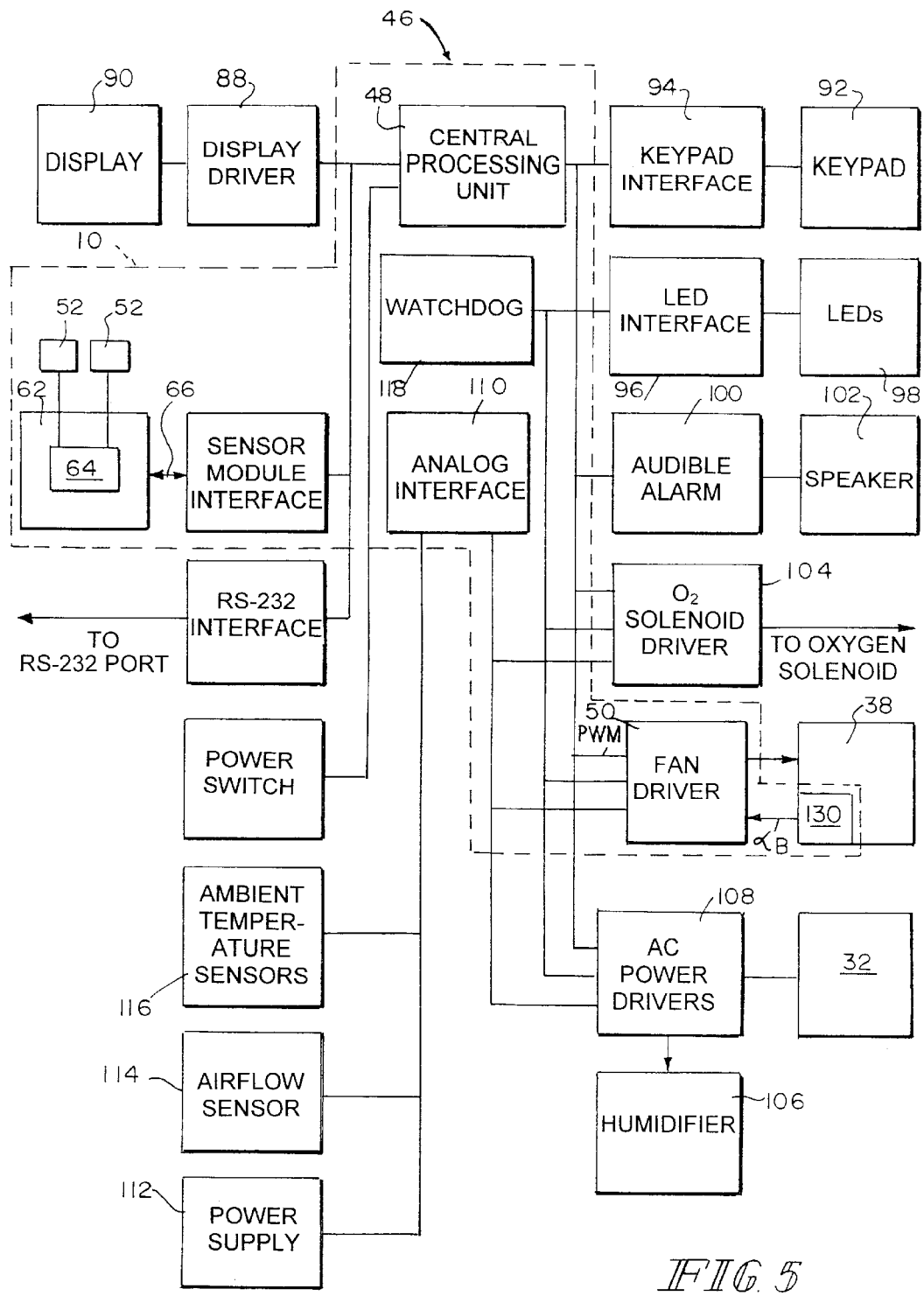
FIG. 5 is a block diagram of the controller assembly, sensor module, blower motor, heater and other systems of the incubator of FIG. 1.

As shown, for example, in FIGS. 4 and 5, in the illustrated embodiment, microprocessor 48 monitors and controls various sensors and systems. Microprocessor 48 communicates through display driver 88 with display 90 permitting system status information to be displayed to a caregiver. A caregiver interfaces with microprocessor through keypad 92 and keypad interface 94 to provide operation mode and set point information and also to request that specific system status information be displayed on display 90. Microprocessor 48 provides additional indications of system status through LED interface 96, LEDs 98, audible alarm 100 and speaker 102. Microprocessor 48 controls the oxygen solenoid of an oxygen container (not shown) through oxygen solenoid driver 104. Power to both the heater 32 and humidifier 106 are controlled by microprocessor 48 through AC power drivers 108. AC power drivers 108, fan driver 50 and oxygen solenoid driver 104 are coupled through analog interface 110 with power supply 112, air flow sensor 114 and ambient air temperature sensors 116. Watchdog 118 is coupled to LEDs 98 through LED interface 96, speaker 102 through audible alarm 100, oxygen solenoid of an oxygen container (not shown) through oxygen solenoid driver 104, blower motor 38 through fan driver 50 and heater 32 and humidifier 106 through AC power drivers 108 to provide appropriate control of those systems and indicators in the event of system failures.

Figure 6:
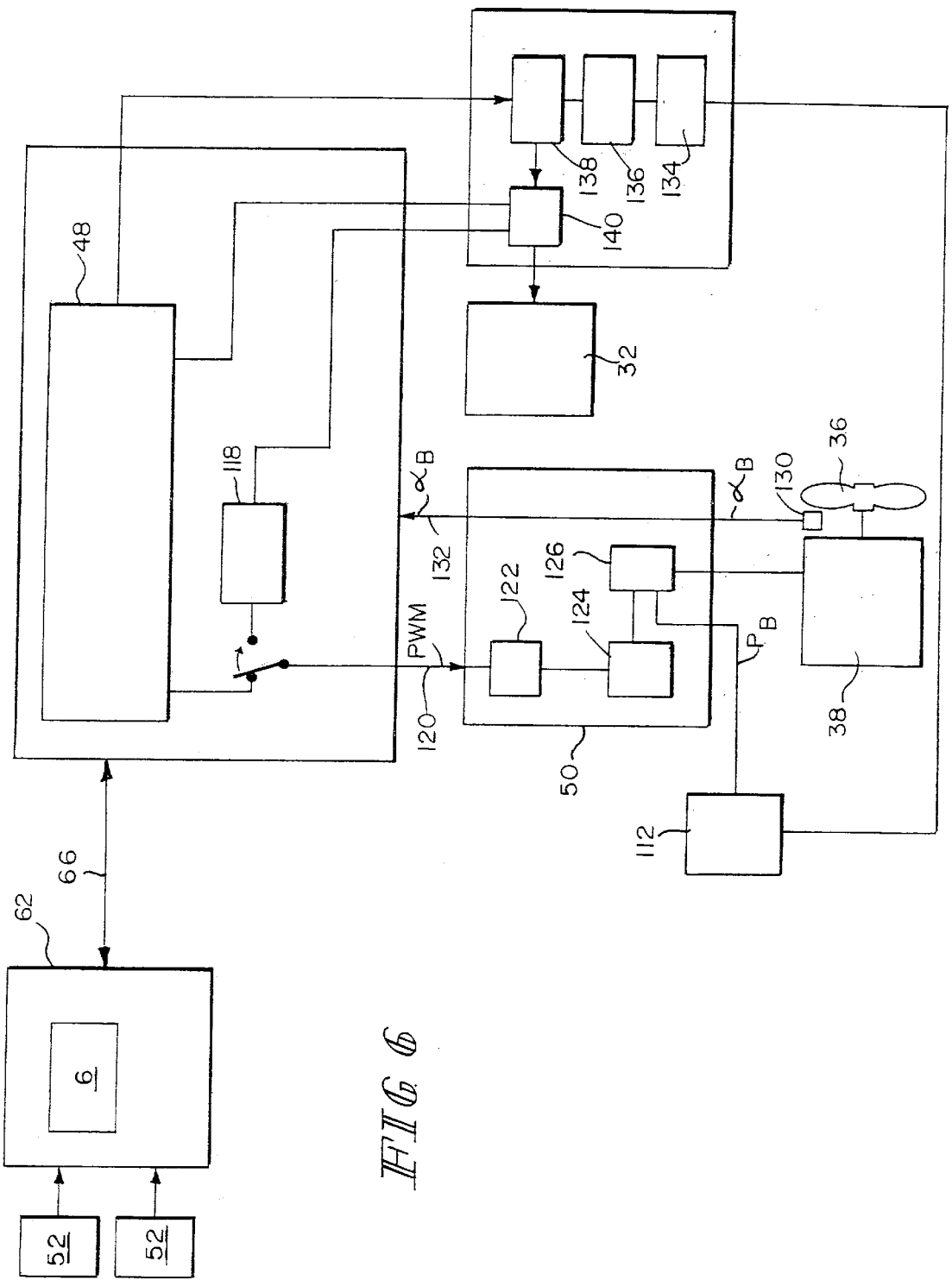
FIG. 6 is a diagrammatic view of the skin probe, sensor module, and portions of the controller assembly which cooperate to control the heater and blower motor.

As shown, for example, in FIGS. 5 and 6, blower motor 38 is coupled to fan driver 50 which is operatively connected to the one or more temperature sensors 52 through signal processing microcontroller 64 and microprocessor 48 to vary the speed ($\alpha_B$) 132 of blower motor 38 dependent, at least in part, upon the temperature stability of the infant 44. Illustratively, fan driver 50 receives a pulse width modulated ("PWM") signal 120 from microprocessor 48. An optocoupler 122 receives the PWM signal 120 from the microprocessor 48 to isolate the microprocessor 48 from the fan driver 50 which is coupled to higher voltages and currents generated by power supply 112. The output of optocoupler 122 is connected to an integrator circuit 124 that converts the PWM signal 120 to an analog signal for motor controller 126, such as an H-bridge controller, for generating a power signal ($P_B$) to drive blower motor 38 at blower speed ($\alpha_B$). Blower motor 38 incorporates hall effect sensors 130 for monitoring and feedback control. Illustratively, hall effect sensors 130 are mounted to the frame of blower motor 38 to sense the passage of magnets (not shown) imbedded in impeller 36. The output of one hall effect sensor 130 is fedback to the microprocessor 48 for measuring the motor speed or angular velocity ($\alpha_B$) 132.

Watchdog 118 provides control signals to fan driver 50 in the event the system begins to operate outside of normal parameters. In the event the watchdog 118 is tripped, the fan motor speed ($\alpha_B$) 132 is maintained at 1500 rpm±450 rpm.

As stated above, microprocessor 48 also monitors and controls the heater power ($P_H$). A current transformer 134 is in series with the power to heater 32 and the humidifier 106. The output of the current transformer 134 is connected to an A/D converter 136 providing a means for controlling the incubator heater 32. Microprocessor 48 controls a solid state relay 138 that controls the power to the heater 32. Microprocessor 48 and watchdog 118 also independently control a safety relay 140. The release of the safety relay 140 removes power from the heater 32 regardless of the functionality of the heater triac 138.

Temperature, humidity, and oxygen concentration control is implemented by means of forced air circulation system 30. A controlled amount of room air 139 (illustratively approximately 7 liters per minute at 800 r.p.m.) is drawn through an air intake filter 142 by blower or impeller 36 located in the shell 16. In addition to drawing fresh filtered air into the incubator, the blower 36 provides for the internal circulation of enclosure air 141 at a much greater flow than that of the fresh air 139 inflow. The total flow of fresh air 139 and recirculated enclosure air 141 is directed past airflow sensor 114 and around the radiator fins 34 of heater 32. The air enters the infant compartment 17 up through inlet slots 40 at the front and rear of deck 22. The air circulates past sensor module 62 which contains air temperature sensor 54. After circulating within infant compartment 17, the air is then re-circulated down through outlet slot 42 in deck 22 and back to blower 36. Temperature is regulated using either incubator air or infant skin temperature as the controlling parameter; the desired mode (air mode or skin mode) is illustratively selected by the caregiver through keypad 92. In either mode of operation, the output of heater 32 is proportional to the amount of heat required to maintain the desired temperature.

In the illustrated device, when in air mode, the air temperature can be maintained from 68F (20C) to 99F (37C) (99F (37C) to 102F (39C) in temperature override mode), as selected by a caregiver through up and down arrows, 144 and 146, respectively, of keypad 92 of control panel 148. The temperature selected from the above range is known as the air setpoint temperature and is stored in memory 158 by microprocessor 48. The incubator air temperature is monitored by air temperature sensor 54 illustratively located in the air intake of sensor module 62 and compared by microprocessor 48 with the air setpoint temperature. Microprocessor 48 uses the air temperature information from air temperature sensor 54 and the air setpoint temperature to generate a control signal supplied to the heater control circuitry in AC power drivers 108 which regulates the output of heater 32 to bring the air temperature in the enclosure to, and maintain it approximately at, the air setpoint temperature. Those skilled in the art will recognize that the control signal for output of heater 32 can be generated using known control algorithms based on the air temperature error, i.e. the difference between the measured temperature and the setpoint temperature. Among those known algorithms are proportional control, proportional integral (PI) control, proportional differential (PD) control and proportional integral differential (PID) control. Other known algorithms may be used to control the heater 32 in air mode.

The air temperature sensed by air temperature sensor 54 is displayed on display 90. A second sensor (not shown) within sensor module 62 serves as a backup to limit the maximum incubator temperature. In the event that the maximum incubator air temperature is exceeded, heater 32 is shut off.

In the first illustrated embodiment, in air mode, the blower speed ($\alpha_B$) is maintained at a set level prior to stabilization of the temperature of infant 44 at or near the infant setpoint temperature. Illustratively, the blower speed ($\alpha_B$) is maintained at 800 r.p.m. to create an average air flow rate of less than 10 cm/sec over infant 44. Under certain conditions, such as during a prewarm operation or when access panels are known to be open, the blower speed ($\alpha_B$) in the disclosed incubator is increased, illustratively to 2000 r.p.m. creating an average flow rate of greater than or approximately equal to 15 cm/sec over infant 44. Thus, under many conditions, fan speed ($\alpha_B$) is typically controlled by selecting one of a plurality (illustratively two) preselected motor speeds ($\alpha_{Bhigh}$)($\alpha_{Blow}$). If the infant is able to regulate its body temperature at a desired level with the incubator in air temperature mode, adaptive motor speed control is implemented to reduce the blower speed ($\alpha_B$).

In air mode, the infant's temperature is a function of the air temperature in enclosure 17 and the infant's ability to establish and maintain its own temperature. A small infant 44, or one with underdeveloped homeostatic control, may not be able to maintain a stable temperature at the desired level in air temperature mode. Thus, in the illustrated incubator, a skin temperature mode or skin mode is provided.

In skin mode, the infant's temperature can be selected from 93F (34C) to 99F (37C) (99F (37C) to 100F (38C) in temperature override mode) by up and down arrow keys, 144 and 146, respectively, on keypad 92 on front panel 148. The selected temperature from this range of temperatures is known as the skin setpoint temperature. Skin temperature sensor 52 is attached directly to the skin of infant 44. The skin temperature information from the from the sensor 52 is supplied through sensor module 62 to microprocessor 48.

Illustratively, microprocessor 48 compares the skin temperature measured by sensor 52 to the skin setpoint temperature to generate a skin temperature error. The skin temperature error is used by microprocessor 48 to generate a heater control signal supplied to the heater control circuitry in AC power driver 108 which proportions the output of heater 32 to control skin temperature. Those skilled in the art will recognize that the control signal for the output of heater 32 can be generated using known control algorithms based on the skin temperature error. Among those known algorithms are proportional control, proportional integral (PI) control, proportional differential (PD) control and proportional integral differential (PID) control. Other known algorithms may be used to control the heater 32 in skin mode.

In skin mode, in the first illustrated embodiment, the blower speed ($\alpha_B$) is maintained at a set level prior to stabilization of the temperature of infant 44 at or near the infant setpoint temperature. Illustratively, the blower speed ($\alpha_B$) is maintained at 800 r.p.m. to create an average air flow rate of less than 10 cm/sec over infant 44. Under certain conditions, such as during a prewarm operation or when access panels are known to be open, the blower speed ($\alpha_B$) in the disclosed incubator is increased, illustratively to 2000 r.p.m. creating an average flow rate of greater than or approximately equal to 15 cm/sec over infant 44. Thus, under many conditions, fan speed ($\alpha_B$) is typically controlled by selecting one of a plurality (illustratively two) preselected motor speeds ($\alpha_{Bhigh}$)($\alpha_{Blow}$). If the infant 44 establishes its ability to stabilize its temperature when incubator is being operated in skin mode, adaptive motor speed control takes over control of the blower motor 38.

Figure 8:
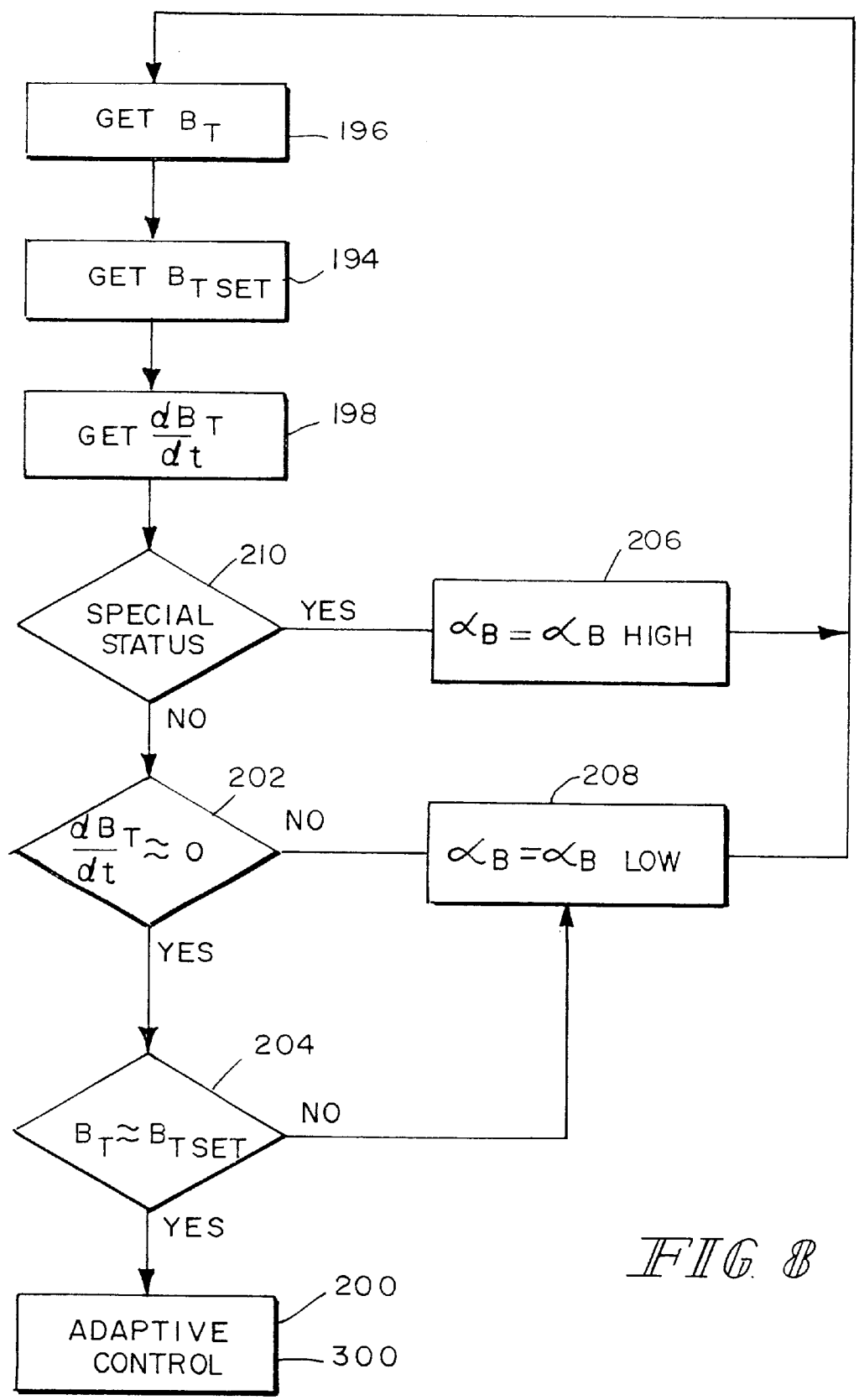
FIG. 8 is a flow chart of the motor speed control algorithm indicating the logic implemented to control the blower motor speed in a first embodiment.

As shown, for example, in FIG. 8, in the first embodiment, the adaptive motor speed controller 10 adaptively controls 200 fan speed ($\alpha_B$) in either air mode or skin mode when the infant's skin temperature ($B_T$) is stable, i.e. $dB_T/dt \approx 0$, 202 and is close to the skin temperature setpoint ($B_{TSet}$) 204. In order to control blower motor 38, adaptive motor speed controller 10 gets the infant setpoint temperature ($_{(BTSET)}$) 194, gets the infant temperature ($B_T$) 196 and gets the differential of the infant's temperature ($dB_T/dt$) 198. Prior to reaching infant temperature stability, or under specific incubator 12 configurations or conditions, control of blower speed ($\alpha_B$) is handled by known algorithms adapted to address the specific configuration or condition, such as choosing one of two preselected speeds. For example, when an access panel is open, providing an indication of a special state 210, blower speed ($\alpha_B$) may be increased to its maximum value ($\alpha_{Bhigh}$) 206 in order to produce a more powerful air curtain to entrain ambient air. While infant skin temperature is far below the setpoint value ($B_T << _{(BTSET)}$), indicating another special state 210, blower speed ($\alpha_B$) may also be set to its maximum value ($\alpha_{Bhigh}$) 206 in order to facilitate rapid warming of infant 44. Illustratively, when infant skin temperature is below the setpoint ($B_T < B_{TSet}$) or above the setpoint ($B_T > B_{TSet}$) or is not stable ($dB_T/dt \approx 0$), blower speed is set to lower value ($\alpha_{Blow}$) 208. In the illustrated embodiment, when incubator 12 is in its normal closed configuration and the infant's temperature is near the setpoint ($B_T \approx _{(BTSET)}$) and stable ($dB_T/dt \approx 0$), adaptive motor speed control is implemented 200, 300. The speed ($\alpha_B$) of blower motor 38 is controlled at least in part based on the temperature of the infant 44 and in part based on the stability of the infant's temperature.

FIG. 7 diagrammatically illustrates incubator 12, control system 46 and air circulation system 30. Control system 46 includes adaptive motor speed controller 10 and heater controller (not numbered to avoid confusion) including air temperature control circuitry 160, skin temperature control circuitry 162 and relay 138. Those skilled in the art will recognize that speed controller 164 includes microprocessor 48, microcontroller 64, fan driver 50 of adaptive motor speed controller 10. In FIG. 7, setpoint circuitry 150, comparator 152, temperature differential circuitry 154 and heater power differential circuitry 156 are illustrated as being separate components from speed controller 164. In the illustrated embodiment of incubator 12, setpoint circuitry 150, comparator 152, temperature differential circuitry 154 and heater power differential circuitry 156 are implemented, at least in part, by microprocessor 48.

As shown in phantom lines in FIG. 7, control system 46 may also include other known sensors and switches, collectively shown as box 128, that provide input to speed controller 164 to regulate the operation of the motor 38 driving blower 36 and to the heater controller (not numbered) to regulate heater operation. Examples of such sensors and switches 164 would include a door open switch (not shown) that would provide an indication that the door or an access panel of incubator 12 is open, an oxygen sensor 58 that would provide an indication to increase air flow when oxygen levels in the enclosure fall below a set level, an incubator warm-up mode indicator (not shown), ambient air temperature sensors 116, and similar sensors and switches.

Adaptive motor speed controller 10 includes one or more skin temperature sensors 52 for determining the temperature of the infant 44, hall effect sensors 130, set point circuitry 150, comparator 152, temperature differential circuitry 154, heater power differential circuitry 156 and speed controller for blower motor 38. Illustratively, setpoint circuitry 150 is implemented through keypad 92, keypad interface 94 and microprocessor 48. A caregiver using the keypad 92 is able to enter a setpoint value ($_{(BTSET)}$) for infant skin temperature which is stored in memory 158 by microprocessor 48. Illustratively, comparator 152 is implemented in software or programming instructions driving microprocessor 48 which compares the current skin temperature data ($B_T$) received through sensor module 62 from sensor 52 to the skin setpoint temperature ($_{(BTSET)}$) Illustratively, temperature differential circuitry 154 and heater power differential circuitry 156 are implemented in microprocessor 48 which runs a known algorithm for determining the time rate of change of the heater power and infant temperature using current values and stored values of infant temperature ($B_T$) and heater power ($P_H$). While shown as being implemented at least in part by microprocessor 48, it is within the teaching of this disclosure for setpoint circuitry 150, comparator 152, temperature differential circuitry 154 and heater power differential circuitry 156 to be implemented by discrete components and/or integrated circuits.

Skin temperature sensor 52 provides an output indicative of the temperature of the infant 44. Sensor module 62 and microprocessor 48 condition the output from skin temperature sensor to provide a current value of infant skin temperature ($B_T$). The illustrated skin temperature sensor 52 is a skin contacting probe of the type commonly available for use in attachment to a hospital patient. However, it is within the teaching of the disclosure to use one or more sensors 52 capable of directly or remotely sensing the skin temperature of infant 44 and providing an output indicative of the skin temperature. Examples of other sensors for sensing the skin temperature of infant 44 are contact thermistors, digital thermometers, infra-red sensors, and the like.

Illustratively, blower motor 38 is a variable speed motor having at least two speeds ($\alpha_{Bhigh}$)($\alpha_{Blow}$) other than idle. Preferably, blower motor 38 is a variable speed motor having speeds continuously variable between a maximum speed ($\alpha_{max}$) and a stall speed ($\alpha_{stall}$). In the illustrated embodiment, the blower's high speed ($\alpha_{Bhigh}$) is approximately 2000 r.p.m. and the stall speed ($\alpha_{stall}$) is approximately 350 r.p.m. When operating without adaptive blower control, the low speed ($\alpha_{Blow}$) setting of the blower is approximately 800 r.p.m. Those skilled in the art will recognize that the high, low, max and stall speeds will vary depending upon the blower motor 38 and impeller 36 used and the configuration of incubator 12 in which adaptive motor speed controller 10 is implemented. Blower motor 38 is controlled by speed controller 164 operatively connected thereto and to one or more of the one or more skin temperature sensors 52. Adaptive motor speed controller 10 varies the speed ($\alpha_B$) of the motor 38 by incrementally decreasing motor speed ($\alpha_B$) while infant 44 is able to maintain its temperature.

Healthcare providers have found it advantageous to regularly circulate the air within an incubator enclosure 17 so that proper oxygen content may be maintained within the enclosure 17. In the first embodiment of incubator 12, as stated above, when adaptive motor control is not activated, blower motor 38 is operated at a sufficient speed ($\alpha_{Blow}$) to draw approximately seven liters of room air 139 into enclosure 17 to be mixed with enclosure air 141 to replenish oxygen and remove carbon dioxide. As shown, for example, in FIG. 9, in the first embodiment, when adaptive motor control 200 is activated the blower speed ($\alpha_B$) is incrementally reduced over time 220 so long as the infant's temperature ($B_T$) remains stable ($dB_T/dt=0$) 218. However, illustratively, blower speed ($\alpha_B$) is not reduced below a lower limit ($\alpha_{Blimit}$) sufficient to replenish oxygen and remove carbon dioxide. Illustratively, upon implementing adaptive control 200, 300, the minimum motor speed ($\alpha_{Bmin}$) is initially set at the replenishment limit ($\alpha_{Blimit}$) 224 and motor speed ($\alpha_B$) is not allowed to fall below ($\alpha_{Bmin}$). Those skilled in the art will recognize that the lower limit of blower speed ($\alpha_{Blimit}$) will be above the stall speed ($\alpha_{stall}$) of blower motor 38, i.e. $\alpha_{Blimit} > \alpha_{stall}$. Therefore, in the disclosed embodiment, the motor 38 runs continuously when an infant 44 is in the enclosure 17 to ensure proper air circulation to allow oxygen to be replenished and excess carbon dioxide to be removed. It is within the scope of the invention for oxygen replenishment and carbon dioxide removal to be accomplished with intermittent operation of the motor 38.

Referring to FIG. 7, when adaptive motor speed control is implemented, the operation of heater 32 continues to be regulated by a controller (not numbered) that activates the heater 32 when a set of parameters is met. In the illustrated example, heater controller shares some components with adaptive motor speed controller 10. Heater controller includes air temperature sensor 54, air temperature control circuitry 160, electrically actuated relay 138, infant temperature control circuitry 162, comparator 152, set point circuitry 150, and infant temperature sensor 52. In air mode, heater operation is controlled in part by air temperature control circuitry 160 coupled to the air temperature sensor 54 to enable heater operation by closing relay 138 only when the air temperature in the enclosure 17 falls below a selected value, such as, for example, 39° C. In skin mode in the illustrated embodiment, heater operation is regulated in response to the error signal from comparator 152 indicating the relative values of the baby's temperature measured by skin temperature sensor 52 and a infant setpoint temperature established by setpoint circuitry 150. Heater operation may also be regulated in response to signals received from other sensors and switches if it is so desired.

In the illustrated embodiment of adaptive motor speed controller 10, comparator 152 is operatively coupled to baby temperature sensor 52 and setpoint circuitry 150 for providing a temperature setpoint signal. The output of comparator 152 is operatively coupled to speed controller 164 and infant temperature control circuitry 162. Thus both heater 32 and blower 36 operation is regulated in response to the temperature of infant 44 when in skin mode. As previously mentioned, in the illustrated embodiment, if the temperature of infant 44 is far below the setpoint value ($B_T << _{(BTSET)}$), adaptive motor speed controller 10 causes the blower motor 38 to operate at a higher speed ($\alpha_{Bhigh}$) to facilitate rapid warming of infant 44. Once the temperature of infant 44 is equal to or above the setpoint value ($B_T \geq _{(BTSET)}$), but not yet stable, the speed of the blower motor 38 is reduced to a lower value ($\alpha_{Blow}$) (See steps 202 and 208 in FIG. 8).

Figure 9:
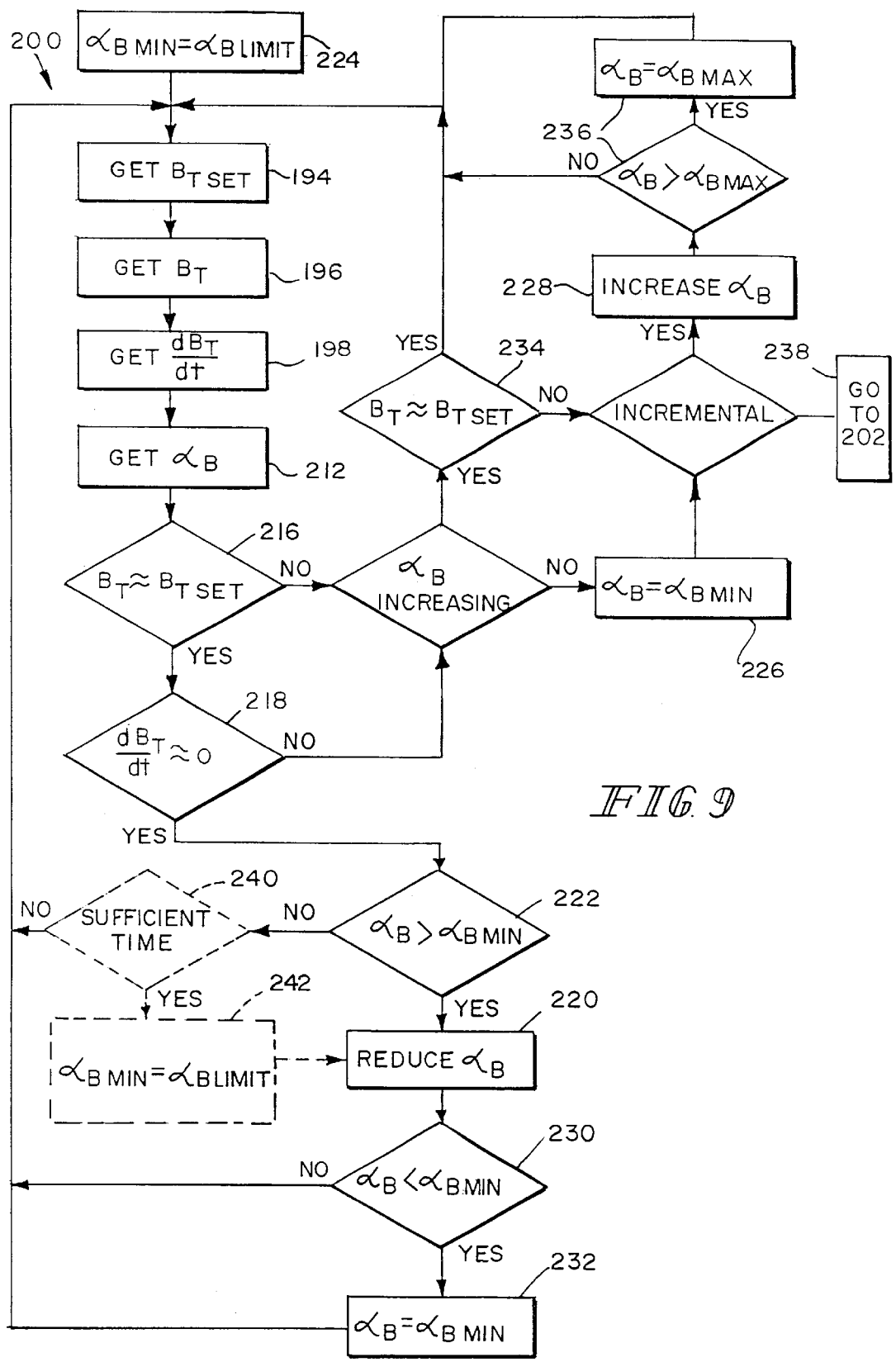
FIG. 9 is a flowchart of a first embodiment of an algorithm implemented to adaptively control the blower motor speed.

In the illustrated embodiment, when the temperature of the infant 44 is at or near the setpoint temperature and the infant's temperature is stable, adaptive motor speed controller 10 begins to gradually reduce the blower speed over time, as shown in step 220 in FIG. 9. So long as the infant's temperature is stable ($dB_T/dt \approx 0$) 218 and at or near the setpoint temperature ($B_T \approx _{(BTSET)}$) 216, adaptive motor speed controller 10 continues to reduce the blower speed 220 until the lower limit for proper ventilation ($\alpha_{Blimit}$) is reached and then maintains the blower speed at the lower limit for proper ventilation ($\alpha_{Blimit}$). Initially, the lower limit of blower speed ($\alpha_{Bmin}$) is set equal to the replenishment limit ($\alpha_{Blimit}$) 224 and the blower speed is not reduced below the lower limit ($\alpha_{Bmin}$). Step 222 checks whether blower speed ($\alpha_B$) is greater than ($\alpha_{Bmin}$), if it is, blower speed is reduced in step 220. Controller 10 then checks to see if ($\alpha_B$) is less than ($\alpha_{Bmin}$) 230, if it is, blower speed ($\alpha_B$) is set to ($\alpha_{Bmin}$) 232 to avoid reduction of blower speed below ($\alpha_{Bmin}$).

If the infant's temperature becomes unstable (either during the process of reducing blower speed or when blower speed has reached the lower limit for proper ventilation ($\alpha_{Blimit}$)), adaptive motor speed controller 10 increases blower speed 228. The blower speed at which temperature instability occurred is stored 226 and is treated for a period as the minimum blower speed level ($\alpha_{Bmin}$) which should be used in treating the infant. During subsequent reductions in blower speed, the blower speed is not reduced below this recorded blower speed ($\alpha_{Bmin}$) 222. It is within the teaching of the disclosure, for reduction to continue toward the ventilation limit ($\alpha_{Blimit}$) if the infant's temperature remains stable for a period of time at the recorded minimum blower speed ($\alpha_{Bmin}$). As shown in phantom lines in FIG. 9, if a sufficient time has passed after reaching the recorded speed ($\alpha_{Bmin}$) 238, the recorded speed ($\alpha_{Bmin}$) is reset to the ventilation limit ($\alpha_{Blimit}$) 240 and the blower speed is reduced 220. In such case, a new minimum treatment limit ($\alpha_{Bmin}$) will be stored upon temperature instability being indicated.

When temperature instability is indicated, the increase in blower speed is preferably implemented incrementally. The blower speed ($\alpha_B$) is increased until the infants temperature is approximately equal to the setpoint temperature ($B_T \approx {}_{(BTSET)}$) 234 or an upper limit of motor speed ($\alpha_{Bmax}$) is reached 236. It is within the scope of the present disclosure for adaptive motor speed controller 10 to immediately adjust the blower speed to a set speed 238, eg. ($\alpha_{Blow}$), when instability is indicated.

A certain air flow is maintained at the reduced motor speed, i.e. ($\alpha_{Bmin} \geq \alpha_{Blimit}$), so that oxygen may be replenished and carbon dioxide removed from the air in the enclosure. At this reduced air flow, infant 44 in incubator 12 experiences less convective heat loss and insensible water loss than at an increased air flow. The reduction in blower motor speed ($\alpha_B$) also reduces the noise generated by the blower motor 38 and thus the internal sound level in enclosure 17. The motor speed, and thus the air flow rate and noise within enclosure 17, are controlled within limits. Thus, the infant's metabolic energy can be channeled towards growth rather than reacting to the environment.

It should be noted that some infants 44 may require a large amount of power to sustain adequate temperatures and temperature stability, while others (the larger, less ill infants 44) would require less power. In the first illustrated embodiment of adaptive motor speed controller 10, the start of the blower speed reduction does not occur until some form of stability is determined. Classically, infant temperature stability can be determined by looking at the rate of change (first derivative) of the infant's temperature. In the first illustrated embodiment of adaptive motor speed controller 10, when the time rate of change of the infant's temperature ($dB_t/dt$) is zero, or some other very small value, the infant's temperature is assumed to be stable. In the illustrated embodiments, the infant temperature signal to be fed into microprocessor 48 which stores the current value and one or more prior values of the infant's temperature as temperature data in memory 158. Known algorithms are then applied to the current value and the prior values of the infant's temperature to directly determine $dB_t/dt$ based on the sampling rate of temperature data. It is within the teaching of the disclosure for the temperature signal to be input into a differentiating amplifier and using the amplifier's output as the value of $dB_t/dt$.

Another indicator of infant temperature stability is the time rate of change of the power provided to the heater ($dP_H/dt$). The illustrated embodiment of adaptive motor speed controller 10 includes heater power differential circuitry 156 that provides an indication to speed controller 164 of the time rate of change of the power provided to the heater ($dP_H/dt$). When the time rate of change of the power provided to the heater ($dP_H/dt$) is near zero, it can be assumed with little error that the infant's temperature is stable ($dB_t/dt \approx 0$). Thus, the time rate of change of the power provided to the heater ($dP_H/dt$) can, within the teaching of the disclosure, be used as the sole indicator of infant temperature stability ($dB_t/dt \approx 0$). It is also within the teaching of the disclosure for adaptive motor speed control to be implemented only when both $dB_t/dt \approx 0$ and $dP_H/dt \approx 0$.

Figure 10:
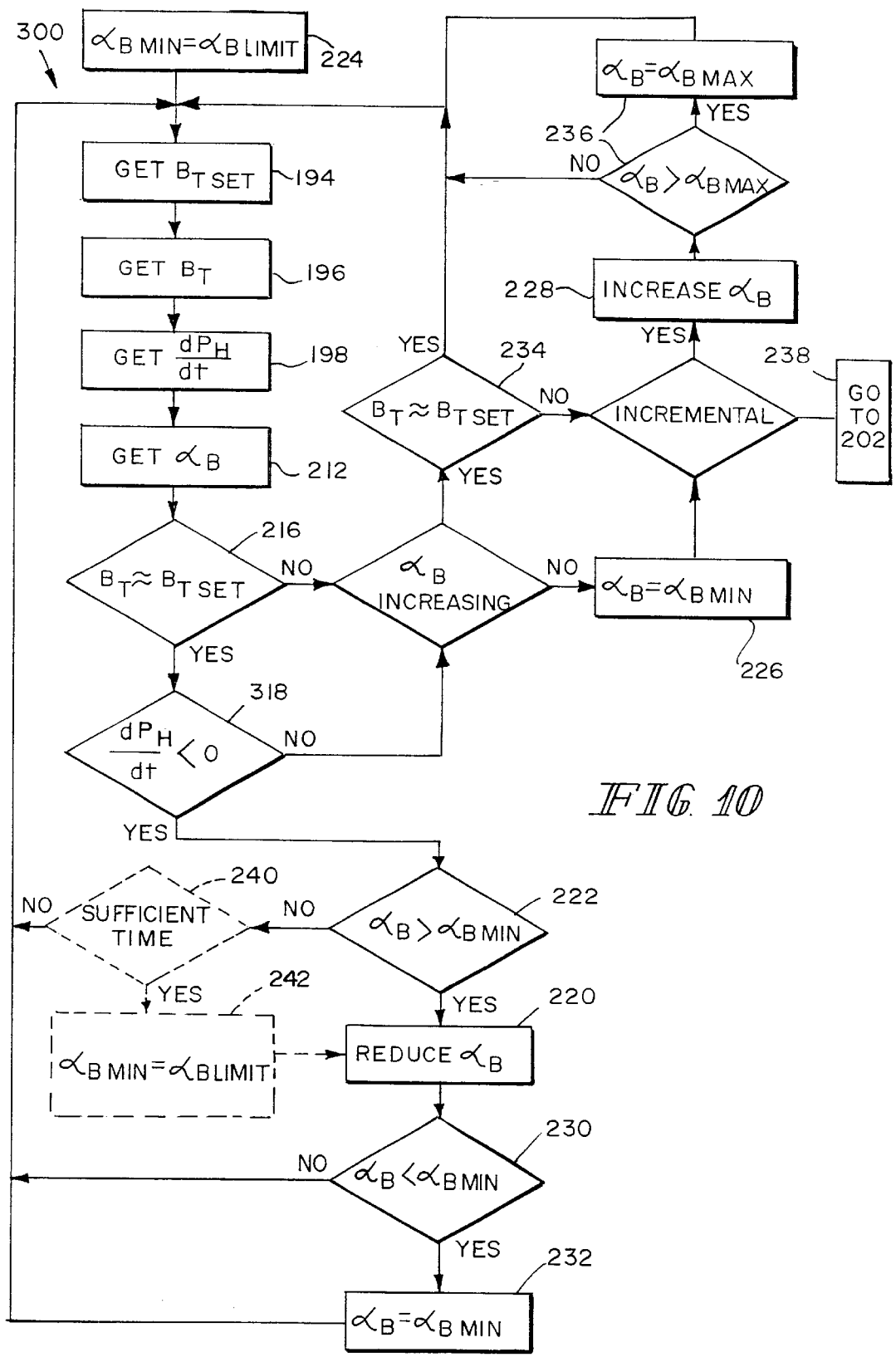
FIG. 10 is a flowchart of a second embodiment of an algorithm to adaptively control the blower motor speed.

In the illustrated embodiments of incubator 12, as the temperature of the infant 44 approaches the desired setpoint temperature, the heater power requirement is reduced. As shown, for example, in FIG. 10, in a second embodiment of an adaptive control algorithm 300 of adaptive motor speed controller 10, this reduction in the heater power ($dP_H/dt<0$) 318 is used to trigger motor speed reduction 220 so that the adaptive motor speed controller 10 gradually reduces the speed of the motor 38 to a maintenance level ($\alpha_{Bmin}$) 232. At the maintenance level ($\alpha_{Bmin}$), the blower motor 38 is rotating fast enough to provide the necessary recirculation of air, however, the air velocity and internal sound pressure from motor operation are significantly reduced compared to full speed blower operation ($\alpha_{Bhigh}$ or $\alpha_{Blow}$). The remainder of algorithm 300 is similar to first algorithm 200 so similar reference numerals are used in identifying similar steps.

Figure 11:
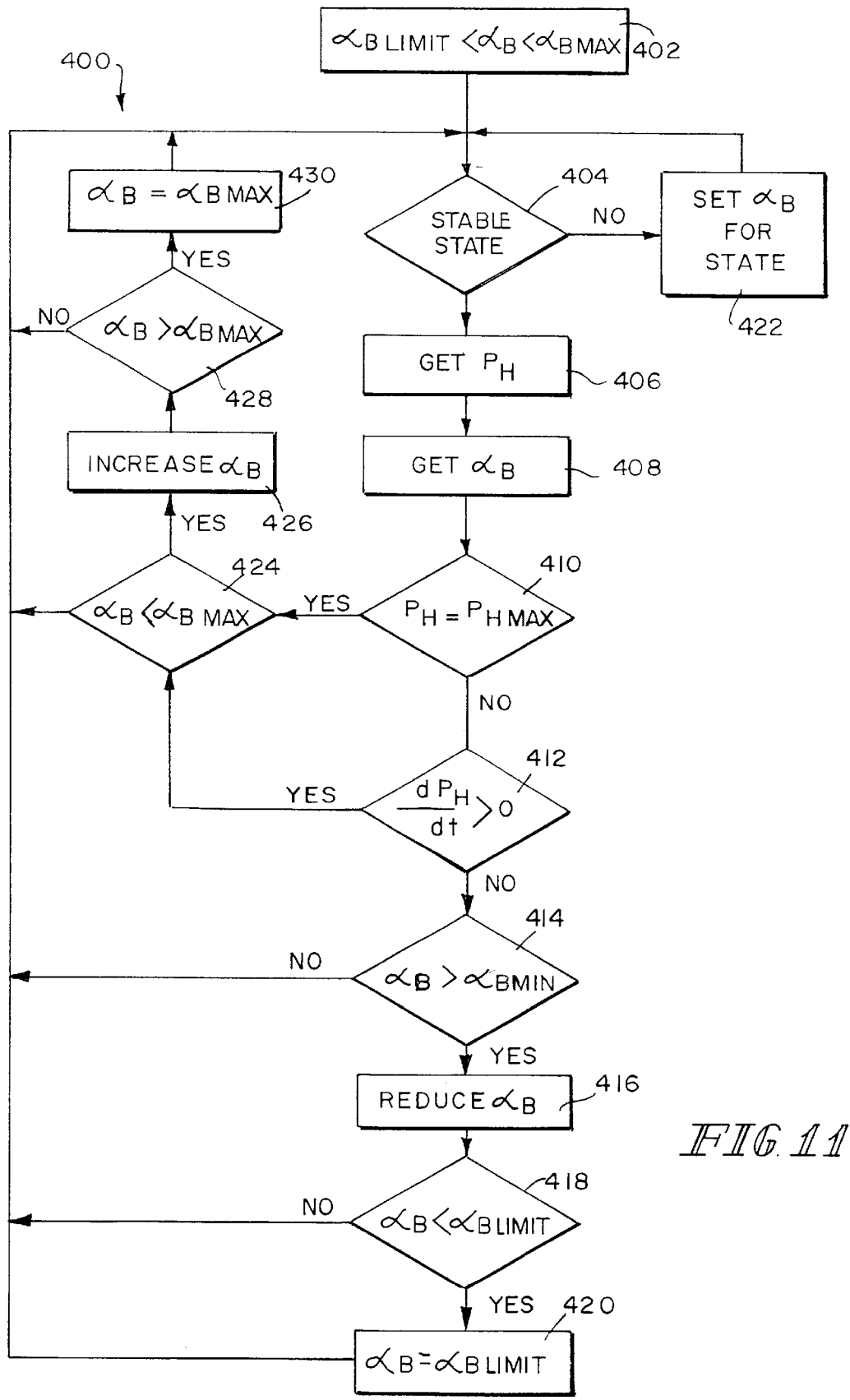
FIG. 11 is a flowchart of a third embodiment of an algorithm to adaptively control the blower motor speed.

As shown, for example, in FIG. 11, in an alternative embodiment 400 of adaptive motor speed controller 10, temperature stability of the infant 44 is determined by examining the heater power ($P_H$) required to sustain the infant's temperature. Initially, the blower speed ($\alpha_B$) is set somewhere between the lower limit of blower speed for oxygen replenishment ($\alpha_{Blimit}$) and the maximum blower speed ($\alpha_{Bmax}$) 402. In this embodiment, blower speed is continuously controlled between the lower limit ($\alpha_{Blimit}$) and upper limit ($\alpha_{Bmax}$). If the incubator is determined to be in a stable state 404, as explained hereafter, the power to the heater is obtained 406 and the speed of the blower is obtained 408. If full heater power is required 410, it can be assumed that the infant is "colder" than desired. Thus, if full heater power is being used 410, adaptive motor speed controller 10 increases the motor speed 426 allowing the incubator's systems to respond more quickly to the infant's needs. So long as full heater power is required 410, blower speed is incrementally increased 426 over time so long as it is less than the maximum blower speed ($\alpha_{Bmax}$) 424. If an increase in blower speed 426 causes blower speed to exceed the maximum blower speed 428, then blower speed is set to maximum blower speed 430. Thus, an infant who is getting cold is heated at a faster rate to their point of thermal equilibrium.

Use of this algorithm for determining infant temperature stability using heater power is appropriate when the incubator system knows the system itself is stable 404. For example, there may be other control systems in operation overriding the stable condition heater control algorithm 422 that may force full heater power when a panel is opened, in an effort to keep the infant stable before he loses heat. However, if system sensors indicate that the system is in a known stable state 404 then the heater power can be used as an indication of the infant thermal stability. When heater power is less than full 410, motor speed is gradually reduced 416 to as low as the ventilation limit ($\alpha_{Blimit}$) 420. Reduction of blower speed continues so long as ventilation limit has not been reached 414 and heater power does not increase 412. If a reduction in blower speed 416 causes blower speed to decrease below the ventilation limit 418, the blower speed is set to the ventilation limit 420. Upon heater power increasing 412, blower speed is gradually increased 426 over time for as long as heater power is increasing and not at full power.

Thus, under any of the above described control algorithms, the adaptive motor speed controller 10 adjusts the blower speed based upon how well the incubator and its systems are able to control the temperature of infant 44. In the event the unit is experiencing difficulty in controlling the temperature of infant 44, the adaptive motor speed controller 10 increases the blower speed to provide for a greater degree of control. If the incubator and its systems are able to maintain the infant's temperature in a stable manner, blower speed is reduced within limits.

While in several embodiments of adaptive motor speed controller 10, blower speed reductions and increases are referred to as occurring incrementally, it is within the teaching of the disclosure for increases and reductions in blower speed control to be implemented continuously and/or gradually. Also, while the description describes controlling the speed of the blower motor 38, those skilled in the art will recognize that such control inherently controls the speed of the blower 36 when the blower 36 is rigidly coupled to the shaft of the blower motor 38. It is within the teaching of the disclosure for blower 36 to be coupled through some form of transmission or gearing to the shaft of the motor 38 and for the speed of the blower 36 to be controlled through controlling the gearing or transmission while the motor remains at a constant speed or by controlling both the motor speed and the gearing and transmission. Also, although the noise reduction benefits will not be fully recognized, it is within the teaching of the disclosure as presently perceived to control the volume of air flow circulating in the incubator chamber by controlling dampers or deflectors in the ductwork of the incubator.

Although the invention has been described in detail with reference to a certain illustrated embodiment, variations and modifications exist within the scope and spirit of the invention as described and defined in the following claims.

What is claimed is:

1. An infant care unit of the type having a platform upon which an infant rests, a canopy over the infant providing an enclosure with a controlled environment for the infant, and an air circulation system having a heater and a blower driven by a blower motor to circulate warm air in the enclosure, the care unit comprising a control system for the air circulation system, the control system including one or more sensors for determining the stability of the temperature of the infant and providing an output indicative of that temperature, and a speed controller for the blower motor, the speed controller being operatively connected to the one or more temperature sensors to vary the speed of the blower motor dependent upon the stability of the temperature of the infant, whereby the blower motor speed is determined at least in part by the stability of the temperature of the infant.

2. The device of claim 1 wherein the speed controller reduces the blower speed when the infant's temperature is stable.

3. The device of claim 2 wherein the blower speed is incrementally reduced so long as the infant's temperature is stable and the blower speed is not below a minimum level required to provide replenishment of oxygen in the enclosure.

4. The device of claim 1 and further comprising setpoint circuitry for establishing an infant setpoint temperature and a comparator, and wherein the one or more sensors establish the temperature of the infant and the speed controller reduces the blower motor speed when the comparator indicates that the infant's temperature is near the setpoint and is stable.

5. The device of claim 4 and further comprising a speed sensor for sensing the speed of the blower motor and wherein the blower speed is incrementally reduced so long as the infant's temperature is stable and the blower speed sensed by the speed sensor is not below a minimum level required to provide replenishment of oxygen in the enclosure.

6. The device of claim 5 wherein the speed controller increases the blower speed when the infant's temperature becomes unstable during speed reduction.

7. The device of claim 6 wherein the blower speed is increased incrementally so long as the infant's temperature remains unstable and a maximum blower speed is not exceeded.

8. The device of claim 1 wherein the stability of the infant's temperature is established by examining the time rate of change of the infant's temperature.

9. The device of claim 8 wherein the speed controller reduces the blower speed when the infant's temperature is stable.

10. The device of claim 9 wherein the blower speed is incrementally reduced so long as the infant's temperature is stable and the blower speed is not below a minimum level required to provide replenishment of oxygen in the enclosure.

11. The device of claim 1 and further comprising a heater controller that varies the power to the heater to control the temperature of the infant by heating air circulated in the enclosure.

12. The device of claim 11 wherein the speed controller receives power feedback information from the heater controller indicating the power supplied to the heater and the speed controller varies the speed of the blower motor in response to the power feedback information.

13. The device of claim 12 wherein the speed controller reduces the blower speed when the time rate of change of the power supplied to the heater is near zero.

14. A blower speed controller for an incubator having a blower for circulating air around an infant, the blower speed controller comprising one or more sensors for determining the stability of the temperature of the infant, the blower speed controller being responsive at least in part to the output of the one or more sensors to vary the blower speed and thereby vary the circulation of air in the incubator.

15. The device of claim 14 wherein blower speed controller reduces the speed of the blower when the temperature of the infant is stable.

16. The device of claim 15 and further comprising a sensor providing an indication of the temperature of the infant, setpoint circuitry for providing a desired temperature of the infant and a comparator for comparing the temperature of the infant and the desired temperature of the infant and wherein the blower controller reduces the speed of the blower when the temperature of the infant is stable and near the desired temperature.

17. The device of claim 16 wherein the blower controller controls the speed of the blower within upper and lower limits.

18. The device of claim 17 wherein the lower limit is established to replenish oxygen to the infant.

19. The device of claim 18 wherein the blower speed controller incrementally decreases the blower speed so long as the infants temperature is stable and near the desired temperature and the lower limit has not been reached.

20. The device of claim 19 wherein the blower speed controller increases the blower speed when the temperature of the infant becomes unstable during blower speed reduction.

21. The device of claim 20 and further comprising a speed sensor for sensing the speed of the blower and memory coupled to the speed sensor and wherein the blower speed controller stores the sensed speed at which the temperature of the infant becomes unstable in memory.

22. The device of claim 21 wherein the speed at which the temperature of the infant became unstable becomes the lower limit for subsequent reductions of the blower speed.

23. A method for varying the blower speed of an incubator air circulation system of the type comprising a blower motor and a motor speed control circuit for circulating air into an enclosure of the incubator, the method comprising the steps of sensing the stability of the temperature of an infant within the incubator and controlling the speed of the blower motor based at least in part on the stability of the temperature of the infant.

24. The method of claim 23 wherein the sensing the stability of the temperature step includes determining the temperature of the infant at different times and determining the time rate of change of the temperature of the infant.

25. The method of claim 23 wherein the controlling the speed of the blower step includes reducing the speed of the blower motor when the infant's temperature is stable.

26. The method of claim 25 and further including the step of repeating the reducing the speed of the blower step while the infant's temperature remains stable.

27. The method of claim 26 and further comprising the steps of establishing a minimum blower speed for replenishment of oxygen in the enclosure and stopping the repeating step prior to reducing the blower speed below the minimum blower speed.

28. The method of claim 27 and further comprising the step of increasing the blower speed when the infant's temperature becomes unstable following a reduction of blower speed.

29. The method of claim 28 and further comprising the steps of recording the speed at which the infant's temperature became unstable during reduction of blower speed and stopping the reducing step in subsequent reductions when the recorded speed is reached.

30. The method of claim 29 and further comprising the step of continuing the reducing step after a period of time if the infant's temperature remains stable upon reaching the recorded speed.

31. A control system controlling the volume of fluid circulated within an incubator carrying an infant, the control system comprising a temperature sensor positioned to sense the stability of the temperature of the infant and providing a temperature signal in response thereto, and fluid flow circuitry operatively coupled to the temperature sensor, the fluid flow circuitry being configured to establish the volume of fluid circulated within the incubator in response to the temperature signal.

32. The system of claim 31 wherein the fluid flow circuitry reduces the volume of fluid circulated when the temperature of the infant is stable.

33. The system of claim 32 and further comprising temperature differential circuitry providing an output indicative of the time rate of change of the temperature of the infant and wherein the output of the differential circuitry is coupled to the fluid flow circuitry.

34. The system of claim 32 and further comprising memory communicating with the fluid flow circuitry and wherein the fluid flow circuitry stores the value of the volume of fluid being circulated when the temperature of the infant becomes unstable and increases the volume of the fluid circulated until the temperature of the infant is stable again.

35. The system of claim 34 wherein the fluid flow circuitry reduces the volume of fluid circulated after the temperature of the infant is again stable so long as the temperature of the infant remains stable and the volume of fluid circulated is greater than the value of the volume of fluid circulated stored in memory.

36. An incubator for an infant, the incubator comprising a platform carrying the infant, a canopy cooperating with the platform to define a chamber receiving the infant, a sensor positioned to sense the stability of the temperature of the infant, the sensor providing a temperature stability signal in response thereto, and a blower assembly including a fan, a motor, and a controller, the motor operating the fan to circulate air within the incubator, the controller being operatively coupled to the motor and to the sensor, the controller establishing the speed of the motor and the speed of the fan in response to the temperature stability signal.

37. The device of claim 36 wherein the controller reduces the speed of the fan when the infant's temperature is stable.

38. The device of claim 37 wherein the speed of the fan is incrementally reduced so long as the infant's temperature is stable and the speed of the fan is not below a minimum level required to provide replenishment of oxygen in the chamber.

39. The device of claim 37 and further comprising setpoint circuitry for establishing an infant setpoint temperature and a comparator, and wherein the sensor establishes the temperature of the infant and the controller reduces the speed of the fan when the comparator indicates that the infant's temperature is near the setpoint and is stable.

40. The device of claim 39 and further comprising a speed sensor for sensing the speed of the fan and wherein the speed of the fan is reduced so long as the infant's temperature is stable and the speed of the fan sensed by the speed sensor is not below a minimum level required to provide replenishment of oxygen in the chamber.

41. The device of claim 40 wherein the controller increases the speed of the fan when the infant's temperature becomes unstable during speed reduction.

42. The device of claim 41 wherein the speed of the fan is increased so long as the infant's temperature remains unstable and a maximum speed is not exceeded.

43. The device of claim 36 wherein the stability of the infant's temperature is established by examining the time rate of change of the infant's temperature.

44. The device of claim 43 wherein the controller reduces the speed of the fan when the infant's temperature is stable.

45. The device of claim 44 wherein the speed of the fan is reduced so long as the infant's temperature is stable and the speed of the fan is not below a minimum level required to provide replenishment of oxygen in the chamber.

46. The device of claim 36 and further comprising a heater controller that varies the power to the heater to control the temperature of the infant by heating air circulated in the chamber.

47. The device of claim 46 wherein the speed controller receives power feedback information from the heater controller indicating the power supplied to the heater and the speed controller varies the speed of the fan in response to the power feedback information.

48. The device of claim 47 wherein the speed controller reduces the speed of the fan when the time rate of change of the power supplied to the heater is near zero.

* * * * *